Patented Dec. 1, 1942

2,303,602

UNITED STATES PATENT OFFICE 2,303,602

CALCIUM TARTRATE PRODUCTION

Geza Braun, New York, N. Y., assignor to Standard Brands Incorporated, New York, N. Y., a corporation of Delaware No Drawing. Application August 3, 1940,
Serial No. 351,159

6 Claims. (Cl. 260—536)

The invention relates to a procedure for the production of calcium tartrate. More particularly, it pertains to the manufacture of calcium tartrate from argols and lees by extraction and conversion, and includes correlated improvements and discoveries whereby the production of calcium tartrate is enhanced.

The manufacture of tartaric acid, for example, from argols and lees, entails the obtention of calcium tartrate as an intermediate product. This is attained by converting potassium acid tartrate contained in the raw material into calcium tartrate by neutralization with calcium hydroxide which forms initially potassium tartrate, and this in turn is converted into calcium tartrate through reaction with calcium chloride. Thereby the potassium acid tartrate is changed into calcium tartrate and potassium chloride. The tartrate is separated, as by a filter press or centrifuge, and the potassium chloride liquor discarded, since the solutions are too dilute for economical recovery.

It is an object of the invention to provide a procedure for the production of calcium tartrate from argols which is attained by the formation of a solution of a potassium salt at a concentration adapted to render recovery commercially feasible.

A further object of the invention is the provision of a procedure whereby calcium tartrate is produced from argols, which entails treatment of the argols in a potassium salt solution.

An additional object of the invention is to provide a process for production of calcium tartrate from argols and lees, which may be practiced readily, effectively and economically on a desired scale.

A still further object of the invention is to provide a process for calcium tartrate manufacture in which argols and/or lees are contacted initially with a concentrated solution of potassium chloride, followed by conversion of potassium tartrate into calcium tartrate through reaction with a soluble calcium compound.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

I have found that precipitation of neutral potassium tartrate with calcium chloride may be effected substantially to completion in a hot concentrated, e. g., supersaturated, solution of potassium chloride, as well as in dilute solutions thereof. Under these conditions the yield of calcium tartrate is about 99% theoretical, and the remaining 1% of calcium tartrate may be recovered from the crystalline potassium chloride and a saturated solution thereof. Thereby potassium salts may be economically recovered from materials containing appreciable amounts of potassium acid tartrate, e. g., argols.

In the practice of the invention the conversion of argols into calcium tartrate may be accomplished by treating the argols initially with water or with a solution of potassium chloride which arises from the treatment of a previous charge. The argols may be suspended in hot water or a hot solution of potassium chloride, preferably a saturated solution, and neutralized with finely pulverized calcium oxide under constant stirring. The neutralization may be brought about also through the introduction of calcium hydroxide. When neutralization has taken place, a soluble calcium compound, as calcium chloride, may be added in an amount sufficient to convert potassium tartrate into calcium tartrate. The initial treatment, as indicated, may be with a solution of potassium chloride, and this solution may be at the outset relatively dilute. A treatment of argols therewith, however, occasions a concentration thereof in potassium chloride, and a repetition leads eventually to a saturated potassium chloride solution. It is such a solution which is preferred in the treatment of argols, and when obtained is then utilized in the treatment of further quantities of argols.

The calcium tartrate formed may be separated from the hot solution in a suitable manner, as by filter pressing or centrifuging, and the mother liquor is then permitted to cool with crystallization of potassium chloride, which may be removed in a desired manner, and the mother liquor then obtained, e. g., a saturated solution of potassium chloride, is employed in the process, and repeatedly so until it is no longer practicable or desirable. The calcium tartrate which has been separated from the liquor may be washed thoroughly, at first with dilute potassium chloride solutions, and finally with water, in order to remove soluble impurities. Washing of the calcium tartrate may be efficiently and economically effected by utilizing the counter-current principle, whereby the calcium tartrate is washed with a relatively small amount of water, and potassium chloride solutions are obtained in concentrated form.

The reaction may be carried out in a suitable arrangement of apparatus, which may include reaction vessels or cookers of suitable capacity, equipped with stirrers and means for heating, as steam coils. In addition, the assembly would include separating means, as filter presses or centrifuges, together with reservoirs, for mother and wash liquors, a crystallizer for potassium chloride, and a preheater. Transfer of the liquors may be accomplished by pumps, with the flow regulated by means of suitable valves.

As an illustrative embodiment of a manner in which the invention may be practiced, the following description is presented. Argols, preferably roasted, and containing about 2000 parts of potassium acid tartrate, may be introduced and suspended, with constant stirring, into a reaction vessel containing 7500 parts of water or of a potassium chloride solution, heated to about 50° C., desirably a saturated solution which may have been obtained in the processing of a previous charge. The reaction mass is now treated with finely divided calcium oxide or calcium hydroxide, suitably in suspension in a saturated potassium chloride solution, until the solution is only slightly acid to litmus. This may require about 320 parts of calcium oxide. Neutral potassium tartrate is thus produced and calcium tartrate formed therefrom and precipitated by the addition of about 780 parts of a soluble calcium compound, e. g., calcium chloride.

During the reaction the temperature rises to about 80° C. due to heat of reaction, and stirring of the mass is continued at this temperature for about 15 to 20 minutes. The reaction is then complete, whereupon calcium tartrate is separated, as by filter pressing, under a pressure of 5-10 lbs. A dark brown clear solution is obtained as a filtrate, and when cooled potassium chloride crystallizes therefrom. The potassium chloride may be removed by vacuum filtration or centrifuge, and the mother liquor, which is a saturated solution of potassium chloride, may be employed as the medium for treating argols in the next charge.

Washing of the calcium tartrate is accomplished first with a strong solution or liquor of potassium chloride and subsequently, when the procedure is in operating sequence, with first and second wash waters arising in a previous processing. The washing is finally with warm water. In the washing operations the various solutions may be preheated before contacting with the calcium tartrate, and as a result of the washing they will be enriched in potassium chloride. Thus, the strong potassium chloride mother liquor becomes a saturated solution which may be united with that which comes from the potassium chloride crystallization and utilized as above indicated. Further, the first wash becomes a strong potassium chloride liquor, and the second wash, which is a dilute potassium chloride solution, becomes the first in the treatment of a succeeding quantity of calcium tartrate. By this procedure there is obtained a calcium tartrate in pure condition, and with about 99% yield. It is practically free from water soluble impurities, and because of this is well adapted to serve as the starting material in the manufacture of pure tartaric acid.

As a by-product, the procedure affords potassium chloride, either in crystalline condition, or as a saturated solution, and it may be utilized for the manufacture of pure potassium chloride by concentrating and crystallizing until nearly all of the potassium chloride is recovered. The crystals so obtained may be added to those coming from the crystallization from a supersaturated solution, and the filtrate or mother liquor is utilizable in the manufacture of fertilizer. A further quantity of calcium tartrate is obtainable from the crude crystallized potassium chloride, which is a light brown material containing 3-6% of calcium tartrate. It may be dissolved in cold water and filtered from the calcium tartrate which is returned to the process and leads to the obtainment of calcium tartrate from argols in a practically quantitative amount. The saturated potassium chloride solution is usually colorless and may find use in the production of cream of tartar, or the potassium chloride may be obtained therefrom in purified form through concentration and recrystallization.

In the foregoing procedure it is to be noted that calcium carbonate may be employed as a neutralizing agent, and conversion of potassium tartrate into calcium tartrate may be occasioned by calcium salts other than calcium chloride, e. g., calcium salts of lower fatty acids, as calcium formate, calcium acetate and the like. Moreover, calcium sulfate may be employed, but with certain attending conditions. When these salts are utilized the potassium is then present as formate, acetate, sulfate, etc. The procedure, however, is to be modified in accordance with the physical properties of the particular potassium salt undergoing treatment. Thus, in the case of the formate and acetate, it is advisable to produce only a concentrated solution because of the marked solubility of these compounds in water. Calcium sulfate should be used in dilute solution inasmuch as calcium tartrate does not precipitate well from neutral potassium tartrate when potassium sulfate is present. Moreover, the reaction between potassium tartrate and calcium sulfate is reversible and equilibrium depends upon the concentration and temperature of the solution. A 5-10% solution of potassium sulfate may be produced, and from this the salt obtained by crystallization. Following separation from the mother liquor such liquor, with a content of unprecipitated tartrate, may be returned to the process or, if desired, it may be treated separately.

As indicated above, the argols and lees may be roasted. This applies especially when the materials are in dry condition, but when moist an autoclaving is more satisfactory. The roasting and autoclaving serve to alter or destroy organic matter, especially wine yeast, which would materially increase the time required for filtration and otherwise make this operation difficult.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the production of calcium tartrate, which comprises suspending a material containing potassium hydrogen tartrate in an aqueous medium, treating with a calcium oxide compound belonging to the group consisting of calcium oxide, calcium carbonate and calcium hydroxide to form a solution of calcium tartrate and neutral potassium tartrate, the said calcium compound being present in a solution of a potassium salt of a strong mineral acid, reacting the solution so produced with a soluble calcium compound to convert neutral potassium tartrate to calcium tartrate, and removing thus obtained calcium tartrate.

2. A process for the production of calcium tartrate, which comprises suspending a material containing potassium hydrogen tartrate in an aqueous medium, treating with a calcium oxide compound belonging to the group consisting of calcium oxide, calcium carbonate and calcium hydroxide to form a solution of calcium tartrate and neutral potassium tartrate, the said calcium compound being present in a saturated solution of potassium chloride, reacting the solution so produced with a soluble calcium compound to convert neutral potassium tartrate to calcium tartrate, and removing thus obtained calcium tartrate.

3. A process for the production of calcium tartrate, which comprises suspending a material containing potassium hydrogen tartrate in a solution of a potassium salt of a strong mineral acid, treating with a calcium oxide compound belonging to the group consisting of calcium oxide, calcium carbonate and calcium hydroxide to form a solution of calcium tartrate and neutral potassium tartrate, the said calcium compound being present in a solution of a potassium salt of a strong mineral acid, reacting the solution so produced with a soluble calcium compound to convert neutral potassium tartrate to calcium tartrate, and removing thus obtained calcium tartrate.

4. A process for the production of calcium tartrate, which comprises suspending a material containing potassium hydrogen tartrate in a saturated solution of potassium chloride, treating with a calcium oxide compound belonging to the group consisting of calcium oxide, calcium carbonate and calcium hydroxide to form a solution of calcium tartrate and neutral potassium tartrate, the said calcium compound being present in a solution of a potassium salt of a strong mineral acid, reacting the solution so produced with a soluble calcium compound to convert neutral potassium tartrate to calcium tartrate, and removing thus obtained calcium tartrate.

5. A process for the production of calcium tartrate, which comprises suspending argols in a hot solution of potassium chloride, treating with calcium hydroxide to form a solution of calcium tartrate and neutral potassium tartrate, said calcium hydroxide being present in a solution of a potassium salt of a strong mineral acid, reacting neutral potassium tartrate in the solution so produced with a soluble calcium compound to convert the neutral potassium tartrate to calcium tartrate, and removing thus obtained calcium tartrate.

6. A process for the production of calcium tartrate, which comprises suspending a material containing potassium hydrogen tartrate in an aqueous medium, treating with a calcium oxide compound belonging to the group consisting of calcium oxide, calcium carbonate and calcium hydroxide to form a solution of calcium tartrate and neutral potassium tartrate, the said calcium compound being present in a solution of a potassium salt of a strong mineral acid, reacting the solution so produced with calcium chloride to convert neutral potassium tartrate to calcium tartrate, and removing thus obtained calcium tartrate.

GEZA BRAUN.